July 9, 1940.  H. A. WHEELER  2,206,990
BAND-PASS FILTER
Filed April 18, 1939
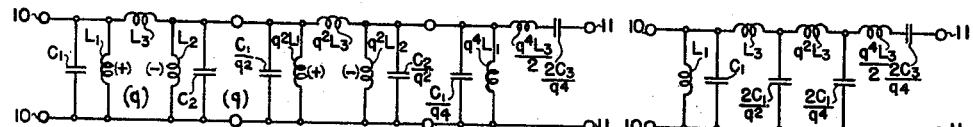
FIG.1.  FIG.2.
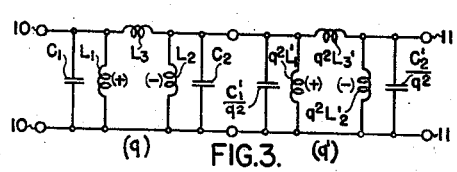
FIG.3.
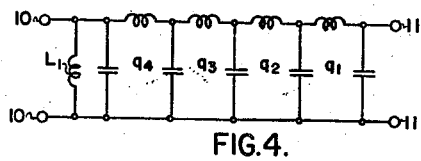
FIG.4.
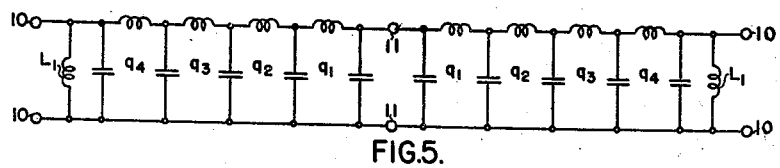
FIG.5.
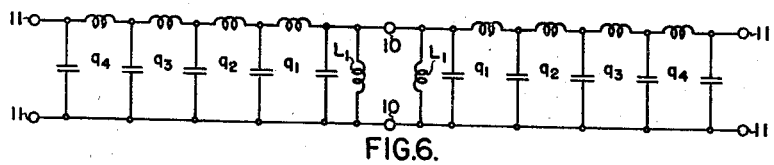
FIG.6.
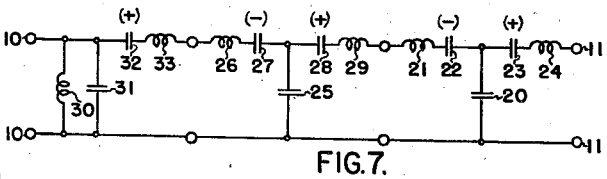
FIG.7.
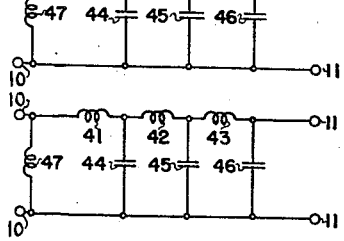
FIG.9.
FIG.10.
FIG.11.
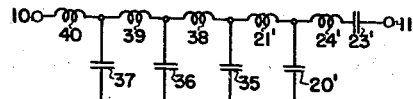
FIG.8.
INVENTOR
HAROLD A. WHEELER
BY Laurence B Dodds
ATTORNEY Patented July 9, 1940

2,206,990

UNITED STATES PATENT OFFICE 2,206,990

BAND-PASS FILTER

Harold A. Wheeler, Great Neck, N. Y., assignor to Hazeltine Corporation, a corporation of Delaware Application April 18, 1939, Serial No. 268,480

12 Claims. (Cl. 178—44)

This invention relates to multisection band-pass filters and particularly to a filter of such type having an image impedance at each of its terminals which may be exactly matched by known filter sections and in which all elements of the filter, except those immediately associated with one or both terminal sections thereof, are of the low-pass filter type; that is, the intermediate sections of the filter are comprised of series-inductance elements and shunt-capacitance elements.

Band-pass filters commonly comprise a group of coupled resonant circuit filter sections, each section comprising reactance elements of opposite kinds in at least one of its arms. Thus, one common type of band-pass filter comprises sections including parallel-resonant shunt arms and series-resonant series arms. It is frequently desirable to provide a band-pass filter in which the intermediate filter sections do not comprise either series capacitance or shunt inductance, that is, one having the configuration of a low-pass filter. This may be desirable for the reason that such reactance elements of sufficient value may be difficult to construct, expensive to manufacture, or excessive in size if the band-pass filter with which they are associated has a relatively low cutoff frequency.

Multisection band-pass filters comprising a group of cascaded filter sections of low-pass configuration have heretofore been provided. Such filters depend on graduating or tapering the image impedances from section to section to provide a lower cutoff frequency, whereas these sections individually have no lower cutoff frequencies but only upper cutoff frequencies. While the terminal image impedance of a filter so constructed have resistive components over at least part of the desired pass band, the law of image impedance variation of such filters is, in general, a discontinuous one which effectively divides the band into a multiplicity of sub-bands, which is undesirable. For this reason, it has not been practicable to utilize such prior art filters in confluent filter networks with simple band-pass filter sections. It is, therefore, particularly desirable to provide a filter comprising a group of sections of low-pass configuration in which the image-impedance characteristics at the terminal sections thereof are of a desired type, that is, either that of constant-$k$ type or of another known type which may be exactly matched by known simple filter sections that pass a continuous band.

It is, therefore, an object of the invention to provide an improved multisection band-pass filter comprising a group of cascaded filter sections of low-pass configuration, tapered with respect to image impedance.

It is a further object of the invention to provide a multisection band-pass filter including such a group of cascaded filter sections of low-pass configuration which is not subject to the above-mentioned disadvantages of the prior art arrangements.

It is a further object of the invention to provide a multisection band-pass filter including such a group of cascaded filter sections of low-pass configuration having a continuous-band pure-resistance image impedance over the pass band.

It is still another object of the invention to provide a multisection band-pass filter comprising such a group of cascaded filter sections of low-pass configuration which has constant-$k$ image-impedance characteristics at the terminals at one or both terminal sections thereof.

In accordance with the invention, a tapered, impedance-transforming multisection band-pass filter comprises a group of cascaded confluent filter sections of low-pass configuration, the reactive constants of the sections being so proportioned that their image impedances vary progressively from section to section. A high-pass filter reactance element is coupled to one or each of the end sections of the group of sections, the rate of variation of the image impedances of the successive groups and the value of the high-pass filter reactance element being so related as to provide continuous-band image-impedance characteristics over a desired pass band. Such a filter thus provides terminal image-impedance characteristics which may be matched with known band-pass filter sections.

In accordance with preferred embodiments of the invention, there may be provided either, or both, a shunt inductance element coupled in the terminal section of lower impedance and a series capacitance element coupled in the terminal section of higher impedance. If both of the above-mentioned elements are utilized, the resulant filter has image-impedance characteristics at the terminals thereof which may be exactly matched by those of constant-$k$ filter sections. Also, in certain preferred embodiments of the invention, only one of the above-mentioned elements is utilized and the rate of variation of the image impedances from section to section is so proportioned relative to the value of the single high-pass impedance element that an image impedance of a known type is provided at each terminal of the filter.

For a better understanding of the invention, together with other and further objects thereof, reference is had to the following description taken in connection with the accompanying drawing, and its scope will be pointed out in the appended claims.

Fig. 1 of the drawing is a circuit diagram of a group of filter sections utilized to explain the general theory of the invention; Fig. 2 is a circuit diagram of a filter derived from that of Fig. 1; Fig. 3 is a circuit diagram of a different embodiment of the invention in which tapering of the image impedances of filter sections of only one type is utilized to provide the desired pass band and the desired terminal image impedance at the high-impedance termination of the filter; Fig. 4 represents a modified filter derived from that of Fig. 3; Fig. 5 is a circuit diagram of two filters of the type of Fig. 4 which may be utilized together as a coupling network between two pairs of terminals each having a relatively low image-impedance level; Fig. 6 is a circuit diagram of a filter network including two filters of the general type of Fig. 4 which may be utilized together as a coupling network between two sets of terminals each having a relatively high image-impedance level; Fig. 7 illustrates another manner of deriving the filter circuit of Fig. 2; Fig. 8 illustrates another means of terminating a filter circuit by tapering in a manner similar to that utilized to derive Fig. 7; and Figs. 9, 10, and 11 represent other embodiments of the invention.

Referring now more particularly to Fig. 1, there is shown a circuit diagram of a filter network embodying the invention derived from two band-pass filter sections of a type well known in the art, to which there is added a constant-$k$, band-pass half-section. The filter section including parallel-resonant shunt arms $C_1$, $L_1$ and $C_2$, $L_2$ and an interposed series inductance arm $L_3$ is a band-pass filter section of a type well known in the art. By a familiar inductive impedance transformation, it is possible to adjust the relative values of $L_1$ and $L_2$ so that $L_1$ is a positive inductance and $L_2$ is a negative inductance, as indicated. The second section of the filter is of a similar type and comprises parallel-resonant shunt arms $C_1/q^2$, $q^2L_1$ and $C_2/q^2$, $q^2L_2$ and an interposed series-inductance arm $q^2L_3$, in which the parameter $q^2$ is the impedance ratio from one section to the next and that of the above impedance transformation. In accordance with the invention, the numerical value of negative inductance $L_2$ is made to equal that of positive inductance $q^2L_1$. It will thus be seen that these inductances, being of opposite signs and equal values, are effectively cancelled, leaving a shunt arm comprising only parallel-connected condensers $C_2$ and $C_1/q^2$ at this junction of the filter. In order to eliminate the negative inductance $q^2L_2$ in the shunt arm of the second filter section, a constant-$k$ band-pass filter half-section is coupled thereto comprising a parallel-resonant arm $C_1/q^4$, $q^4L_1$ and a series-resonant arm $q^4L_3/2$. $2C_3/q^4$ so that the positive inductance $q^4L_1$ effectively cancels the negative inductance $q^2L_2$. There is constant-$k$ image-impedance matching at each junction of these sections. The resultant filter as a whole thus comprises a group of cascaded filter sections of low-pass configurations, these sections having image impedances tapered progressively from section to section, and high-pass filter elements coupled to the terminal sections of the filter. The high-pass filter elements are the uncancelled shunt inductance $L_1$, coupled across terminals 10 at the low-impedance termination of the filter, and series capacitance $2C_3/q^4$ at the high-impedance terminals 11 of the filter.

The symbols used in the following derivation may be defined as follows:

$f_1$=lower cutoff frequency;
$f_2$=upper cutoff frequency;
$q^2$=ratio of impedance transformation within each section, and from one section to the next;
$Z_1'$=image impedance across condenser $C_1$;
$Z_1''$=image impedance across condenser $C_2$;
$R'$=value of $Z'$ at the mean frequency of the pass band;
$R''$=value of $Z''$ at the mean frequency of the pass band;
$k$=coefficient of coupling of the network with $L_1$, $L_2$, $L_3$ regarded as a transformer;
$\omega_1$ and $\omega_2$=angular frequencies corresponding to $f_1$ and $f_2$, respectively.

The following equations apply directly to the first section of Fig. 1, but they may be also applied generally to the other sections:

$$k = \frac{f_2^2 - f_1^2}{f_2^2 + f_1^2} = \sqrt{\frac{L_1 L_2}{(L_1 + L_3)(L_2 + L_3)}} \quad (1)$$

$$q^2 = \frac{Z_i''}{Z_i'} = \frac{R''}{R'} = \frac{C_1}{C_2} \quad (2)$$

$$R' = \frac{1}{C_1(\omega_2 - \omega_1)}; \quad R'' = \frac{1}{C_2(\omega_2 - \omega_1)} \quad (3)$$

$$C_1 = \frac{1}{R'(\omega_2 - \omega_1)}; \quad C_2 = \frac{1}{R''(\omega_2 - \omega_1)} \quad (4)$$

$$L_1 = \frac{1}{C_1 \omega_1^2} \cdot \frac{1-k}{1-k/q} \quad (5)$$

$$L_2 = \frac{q^2}{C_1 \omega_1^2} \cdot \frac{1-k}{1-kq} = \frac{1}{C_2 \omega_1^2} \cdot \frac{1-k}{1-kq} \quad (6)$$

$$L_3 = \frac{q^2}{C_1 \omega_1^2} \cdot \frac{1-k}{k} \quad (7)$$

The following additional equations apply to Fig. 1 if the relations are such as to provide cancellation of each negative inductance by the adjacent positive inductance of the successive section of the filter, in the manner described above:

$$q = \frac{f_2 + f_1}{f_2 - f_1} = \frac{1 + \sqrt{1-k^2}}{k} \quad (8)$$

$$k = \frac{2q}{1+q^2} \quad (9)$$

$$R' = \frac{1}{C_1(\omega_2 - \omega_1)} = \frac{L_3}{2}(\omega_2 - \omega_1) \quad (10)$$

$$C_2 = \frac{1}{R''(\omega_2 - \omega_1)} = \frac{C_1}{q^2} \quad (11)$$

$$C_3 = \frac{C_1(\omega_2 - \omega_1)^2}{2\omega_1 \omega_2} = \frac{1}{L_3 \omega_1 \omega_2} \quad (12)$$

$$L_1 = \frac{1}{C_1 \omega_1 \omega_2} \quad (13)$$

$$L_2 = -q^2 L_1 = -\frac{1}{C_2 \omega_1 \omega_2} \quad (14)$$

$$L_3 = \frac{2R'}{\omega_2 - \omega_1} = \frac{2}{C_1(\omega_2 - \omega_1)^2} = \frac{1}{C_3 \omega_1 \omega_2} \quad (15)$$

The filter of Fig. 2 is exactly equivalent to that of Fig. 1, the adjacent positive and negative shunt inductance elements of the filter of Fig. 1, which are effectively cancelled, being omitted from the circuit of Fig. 2. The circuit of Fig. 2 is, therefore, effective to provide a constant-$k$ mid-shunt image impedance at terminals 10 and a constant-$k$ mid-series image impedance at terminals 11, since such image impedances are characteristic of the type of filter sections used in the derivative shown in Fig. 1.

The development of the filters of Figs. 3 and 4 is analogous to those of Figs. 1 and 2, involving two band-pass filter sections which are of the same type as the first two filter sections of Fig. 1. The first filter section is identical with that of Fig. 1, and comprises two parallel-resonant shunt arms $C_1$, $L_1$ and $C_2$, $L_2$ and an interposed series inductance arm $L_3$. The second filter section differs only in circuit values, and comprises two parallel-resonant shunt arms $C_1'/q^2$, $q^2L_1'$ and $C_2'/q^2$, $q^2L_2'$ and an interposed series inductance arm $q^2L_3'$. The values of the reactive elements of the filter sections of Fig. 3 are so proportioned that negative inductance $L_2$ has the same value as, and, therefore, is cancelled by, positive inductance $q^2L_1'$. In order that inductance element $q^2L_2'$ may not be physically impossible of realization, the relative impedance transformation ratios $q^2$ and $q'^2$ of these filter sections are so proportioned that this inductance element is of infinite value. Under these conditions, the negative inductance elements of the filter of Fig. 3 disappear.

The only relations applicable to the filter network of Fig. 3 which differ from those of Fig. 1 are as follows: In order to make $q^2L_2'$ infinite, $$q' = \frac{1}{k} = \frac{f_2^2 + f_1^2}{f_2^2 - f_1^2} \qquad (16)$$

In order to cancel the shunt inductances at the junction of the two filter sections, $$q = \frac{2 - k/q'}{k} = \frac{2q' - k}{kq'} = \frac{2}{k} - \frac{1}{q'} \qquad (17)$$

To meet both conditions, $$q' = \frac{1}{k} \text{ and } q = \frac{2 - k^2}{k} \qquad (18)$$

The formulas for $C_1'$, $C_2'$, $L_1'$, $L_2'$, and $L_3'$ correspond, respectively, to those for $C_1$, $C_2$, $L_1$, $L_2$, and $L_3$ in Fig. 1, but with $q'$ substituted for $q$.

It will thus be seen that the elements of the filter of Fig. 3 provide a multisection band-pass filter including a group of cascaded filter sections of low-pass configuration, the sections having image impedances tapered from section to section. There is also provided a high-pass filter reactance element, inductance $L_1$, coupled across low-impedance terminals 10 of the filter. The filter of Fig. 3 has constant-$k$ mid-shunt image impedance across low-impedance terminals 10 as well as across high impedance terminals 11.

The filter circuit of Fig. 4 is derived by an extension of that of Fig. 3 and comprises a plurality of tapered filter sections of low-pass configuration across the low-impedance terminals 10 of which is coupled inductance $L_1$. The filter thus is identical to that of Fig. 3 except that additional filter sections are provided, the factor of impedance transformation for the respective sections being $q_1$, $q_2$, $q_3$, and $q_4$. The principle can be extended to any number of sections. The following equations apply to the filter of Fig. 4 and, in general, to the extension of the same principles to any number of sections:

$$q_1 = \frac{1}{k} \qquad (19)$$

$$q_2 = \frac{2 - k/q_1}{k} = \frac{2 - k^2}{k} \qquad (20)$$

$$q_3 = \frac{4 - 3k^2}{k(2 - k^2)} \qquad (21)$$

$$q_4 = \frac{8(1 - k^2) + k^4}{k(4 - 3k^2)} \qquad (22)$$

$$q_n = \frac{2 - k/q_{n-1}}{k} = \frac{2q_{n-1} - k}{kq_{n-1}} = \frac{2}{k} - \frac{1}{q_{n-1}} \qquad (23)$$

$$q_\infty = \frac{1 + \sqrt{1 - k^2}}{k} = \frac{f_2 + f_1}{f_2 - f_1} \qquad (24)$$

in which $q_n^2$ is the factor of impedance transformation of the $n$th filter section, counting from the high-impedance terminals.

The filter of Fig. 5 is comprised of two filters, each of which is like the filter of Fig. 4, the filters being coupled together at their high-impedance terminals 11. The circuit of Fig. 5 is thus effective to couple two sets of terminals 10, 10 of low-impedance level by a band-pass filter of low-pass configuration, the filter having additional inductances $L_1$, $L_1$ across the end pairs of terminals 10, 10.

The filter of Fig. 6 is comprised of two filters, each of which is like the filter of Fig. 4, the filters having their low-impedance terminals 10 coupled together. The filter of Fig. 6 thus effectively comprises a filter of modified low-pass configuration which may be utilized to couple two sets of terminals 11, 11 of a relatively high-impedance level.

The filter of Fig. 2 may also be derived from other band-pass filter sections of known types. A derivation on such other manner is illustrated in Fig. 7. The basic band-pass filter section comprises a capacitive shunt arm 20 and series-resonant series arms 21, 22, and 23, 24. By a capacitance impedance transformation, the impedance levels at the terminals of the filter section may be changed in such manner that capacitance 22 becomes a negative circuit element. If there is then coupled to the filter section just described a second filter section of the same type, the negative capacitance 22 may be effectively cancelled by a positive capacitance in the added section. The next section in Fig. 7 comprises a shunt capacitance arm 25 and series-resonant series arms 26, 27 and 28, 29. Positive capacitance 28 is so proportioned as effectively to cancel negative capacitance 22. In order to provide for the cancellation of negative capacitance 27, there is also added a conventional band-pass filter half-section. This half-section comprises a parallel-resonant shunt arm 30, 31 and a series-resonant series arm 32, 33. The network is so proportioned that positive capacitance 32 is effective to cancel negative capacitance 27. The network of Fig. 7, with such cancellations, reduces exactly to the circuit of Fig. 2.

The filter of Fig. 8 may be derived from the basic section of Fig. 7 and effectively comprises a plurality of band-pass filter sections of the basic type utilized to derive Fig. 7. A negative capacitance of each section is cancelled by the positive capacitance of the successive section in the same manner as was described with reference to Fig. 7. However, in order to provide cancellation of the last negative capacitance, corresponding to negative capacitance 27 of Fig. 7, the filter is so proportioned that this capacitance becomes infinite and therefore may be neglected. This corresponds to the principles described with reference to the filter network of Fig. 3. The filter of Fig. 8 thus comprises capacitances 20' and 23' and inductances 21' and 24' which correspond, respectively, to the elements of Fig. 7 having similar unprimed reference numerals. The remaining elements of the filter of Fig. 8 are shunt capacitances 35, 36, and 37 and series inductances 38, 39, and 40.

The filter of Fig. 9 may be derived in a manner similar to the procedure described above for the derivation of the filter of Fig. 2 and comprises series-inductance arms 41, 42, 43 and shunt-capacitance arms 44, 45, 46 with the addition of a shunt-inductance element 47 across low-impedance terminals 10 and the addition of a series-capacitance element 48 at high-impedance terminals 11.

The filter of Fig. 10 is exactly similar to that of Fig. 9 except that series-capacitance element 48 of Fig. 9 has been omitted by so choosing the impedance transformation ratios as to give it an infinite value.

The filter of Fig. 11 is exactly similar to the filter of Fig. 9 except that inductance element 47 at the low-impedance terminals 10 has been omitted by so choosing the impedance transformation ratios as to give it an infinite value.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A tapered impedance-transforming band-pass filter comprising, a group of confluent filter sections of low-pass configuration, the reactive constants of said sections being so proportioned that their image impedances vary progressively from section to section, and a high-pass filter reactance element coupled to one of the end sections of said group, the rate of variation of said image impedances and the value of said reactance element being so related as to procure continuous-band terminal image-impedance characteristics over a desired pass band.

2. A tapered impedance-transforming band-pass filter comprising, a group of confluent filter sections of low-pass configuration, the reactive constants of said sections being so proportioned that their image impedances vary progressively from section to section, whereby said filter has a low-impedance termination and a high-impedance termination, and a shunt inductance element coupled to the end section of low impedance of said group, the rate of variation of said image impedances and the value of said inductance element being so related as to procure continuous-band terminal image-impedance characteristics over a desired pass band.

3. A tapered impedance-transforming band-pass filter comprising, a group of confluent filter sections of low-pass configuration, the reactive constants of said sections being so proportioned that their image impedances vary progressively from section to section, whereby said filter has a low-impedance termination and a high-impedance termination, a shunt inductance element coupled to the low-impedance end section of said group, and a series-capacitance element coupled to the high-impedance end section of said group, the rate of variation of said image impedances and the value of said inductance and said capacitance elements being so related as to procure continuous-band terminal image-impedance characteristics over a desired pass band.

4. A tapered impedance-transforming band-pass filter comprising, a group of confluent filter sections of low-pass configuration, the reactive constants of said sections being so proportioned that their image impedances vary progressively from section to section, said filter having a low-impedance termination including series inductance and a high-impedance termination, a shunt-inductance element coupled to the low-impedance end section of said group adjacent said series inductance, the rate of variation of said image impedances and the value of said shunt-inductance element being so related as to procure continuous-band terminal image-impedance characteristics over a desired pass band.

5. A tapered impedance-transforming band-pass filter comprising, a group of confluent filter sections of low-pass configuration, the reactive constants of said sections being so proportioned that their image impedances vary progressively from section to section, said filter having a low-impedance termination including series inductance and a high-impedance termination, a shunt-inductance element coupled to the low-impedance termination of said group adjacent said series inductance, said filter comprising a shunt capacitance terminating the end section of high impedance of said group, the rate of variation of said image impedances and the value of said shunt-inductance element being so related as to provide a continuous-band terminal image-impedance characteristic at said low-impedance termination and a constant-$k$ mid-shunt image impedance at said high-impedance termination over a desired pass band.

6. A tapered impedance-transforming band-pass filter comprising, a group of confluent filter sections of low-pass configuration, the reactive constants of said filter sections being so proportioned that their image impedances vary progressively from section to section, whereby said filter has a high-impedance termination and a low-impedance termination, and a shunt-inductance element coupled to the low-impedance end section of said group, said filter comprising a shunt-capacitance element terminating said end section of high-impedance termination, the rate of variation of said image impedances and the value of said shunt-inductance element being so related as to provide a continuous-band terminal image-impedance characteristic at said low-impedance termination and a constant-$k$ mid-shunt image-impedance characteristic at said high-impedance termination over a desired pass band.

7. A tapered impedance-transforming band-pass filter comprising, a group of confluent filter sections of low-pass configuration, the reactive constants of said sections being so proportioned that their image impedances vary progressively from section to section, said filter having a low-impedance termination including shunt capacitance and a high-impedance termination, a shunt-inductance element coupled to the low-impedance end section of said group in parallel with said shunt capacitance, the rate of variation of said image impedances and the value of said shunt-inductance element being so related as to provide a continuous-band image-impedance characteristic at said high-impedance termination and constant-$k$ mid-shunt image impedance at said low-impedance termination over a desired pass band.

8. A tapered impedance-transforming band-pass filter comprising, a group of confluent filter sections of low-pass configuration, the reactive constants of said sections being so proportioned that their image impedances progressively from section to section, said filter having a low-impedance termination including shunt capacitance and a high-impedance termination, a shunt-inductance element coupled to the low-impedance end section of said group in parallel with said shunt capacitance, and a series-capacitance element coupled to the end section of high impedance of said group, the rate of taper of said image impedances and the value of said shunt inductance and said series-capacitance elements being so related as to provide a continuous-band image-impedance characteristic at said high-impedance termination and constant-$k$ mid-shunt image impedance at said low-impedance termination over a desired pass band.

9. A tapered impedance-transforming band-pass filter comprising, a group of confluent filter sections of low-pass configuration, the reactive constants of said sections being so proportioned that their image impedances vary progressively from section to section, said filter having a high-impedance termination including series inductance and a low-impedance termination including shunt capacitance, a shunt-inductance element coupled to the end section of low-impedance of said group in parallel with said shunt capacitance, and a series-capacitance element coupled to the end section of high impedance of said group in series with said series inductance, the rate of taper of said image impedances being so related to the value of said shunt-inductance element and the value of said series-capacitance element as to procure a constant-$k$ mid-series image impedance at said high-impedance termination and constant-$k$ mid-shunt image impedance at said low-impedance termination over a desired pass band.

10. A tapered impedance-transforming band-pass filter comprising, a group of confluent filter sections of low-pass configuration, the reactive constants of said sections being so proportioned that their image impedances vary progressively from section to section, said filter having a high-impedance termination and a low-impedance termination, and a series-capacitance element coupled to the end section of high impedance of said group, the rate of variation of said image impedances and the value of said series-capacitance element being so related as to provide continuous-band terminal image-impedance characteristics over a desired pass band.

11. A tapered impedance-transforming band-pass filter comprising, a group of confluent filter sections of low-pass configuration, the reactive constants of said sections being so proportioned that their image impedances vary progressively from section to section, said filter having a high-impedance termination including series inductance and a low-impedance termination, and a series-capacitance element coupled to the end section of high impedance of said group in series with said series inductance, the rate of variation of said image impedances and the value of said series-capacitance element being so related as to provide a continuous-band image-impedance characteristic at said low-impedance termination and a constant-$k$ mid-series image-impedance characteristic at said high-impedance termination over the desired pass band.

12. A tapered impedance-transforming band-pass filter comprising, a group of confluent filter sections of low-pass configuration, the reactive constants of said sections being so proportioned that their image impedances vary progressively from section to section, said filter having a high-impedance termination including series inductance and a low-impedance termination including shunt capacitance, a series-capacitance element coupled to the end section of high impedance of said group in series with said series inductance, and a shunt-inductance element coupled to the end section of low impedance of said group in parallel with said shunt capacitance element of said low-impedance end section, the rate of variation of said image impedances being so related to the value of said series-capacitance element and the value of said shunt inductance element as to provide a constant-$k$ mid-series image-impedance characteristic at said high-impedance termination and a constant-$k$ mid-shunt image-impedance characteristic at said low-impedance termination over the desired pass band.

HAROLD A. WHEELER.